Figure 7:
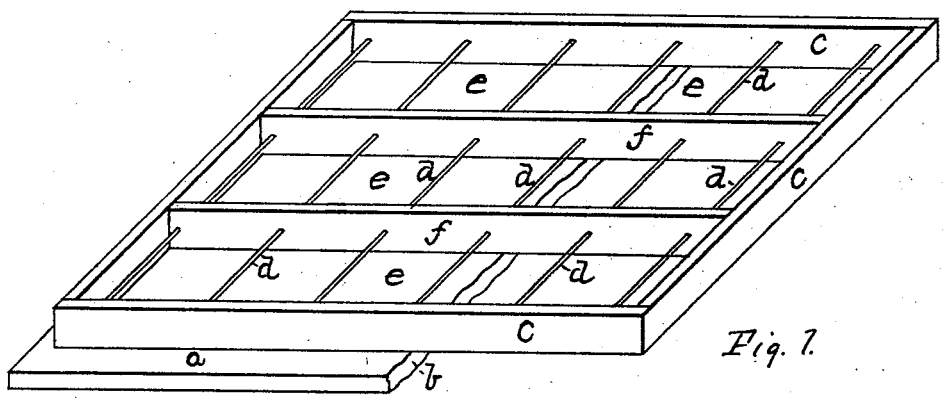

R. TYLER.
Device for Turning Eggs.

No. 168,942. Patented Oct. 19, 1875.

Witnesses.
H. N. Fairbanks
W. E. Brown

Inventor
Royal Tyler
Per Wm Franklin Seavey Atty.

UNITED STATES PATENT OFFICE.

ROYAL TYLER, OF ELLSWORTH, MAINE.

IMPROVEMENT IN DEVICES FOR TURNING EGGS.

Specification forming part of Letters Patent No. 168,942, dated October 19, 1875; application filed September 13, 1875.

*To all whom it may concern:*

Be it known that I, ROYAL TYLER, of Ellsworth, in the county of Hancock and State of Maine, have invented certain new and useful Improvements in Device for Turning Eggs; and I do hereby declare that the following is a full, clear, and exact description thereof, that will enable others skilled in the art to which it appertains to make and use the same, reference being had to the accompanying drawings, forming a part of this specification, in which—

Figure 1 shows a perspective of my invention.

The object of my invention is to produce a simple and cheap device for turning eggs. When eggs are to be kept for some time before using it is well known that they may be preserved with much more certainty if kept where the air may obtain access to them, and the sides upon which they rest changed every day or every two or three days. When eggs are collected for shipping to distant points in large quantities it becomes important to provide some means by which they may be turned or their sides changed with ease and rapidity, turning them by hand being a slow and laborious operation. It is now customary to keep eggs upon shelves or trays.

My invention consists of a rack or frame having wires or similar devices crossing it at right angles, forming openings for the reception of each egg. These wires are so arranged as to cross the frame just below the central line of the eggs as they lie upon their sides. This frame is placed upon a flat surface, the eggs being placed in the openings prepared for them, and resting upon the surface upon which the frame rests.

When it is desired to turn the eggs the frame is moved slightly over the surface upon which it rests, the wires striking the sides of the eggs and causing them to revolve.

In the drawing, $a$ shows the surface upon which the frame and eggs rest, broken off at $b$ to show the construction of the frame, which has no bottom. At $c$ is shown the frame provided with the cross-pieces $d\ f$, forming the openings $e$ to receive the eggs.

The cross-pieces $d\ f$ may be of wire entirely, or partly of wood and partly of wire, as shown, those pieces $d$ by which the eggs are turned being preferably of wire. The chief object of the pieces $f$ is to stiffen the frame.

What I claim as my invention, and desire to secure by Letters Patent, is—

The device for turning eggs herein described, consisting of a bottomless frame, $c$, provided with cross-wires $d$, operating to turn or roll the eggs when the frame is moved horizontally, in combination with a flat surface, $a$, upon which both frame and eggs rest, substantially as set forth.

In testimony that I claim the foregoing, I have hereunto set my hand this 6th day of September, 1875.

ROYAL TYLER.

Witnesses:
CHARLES H. HAYNES,
JAMES M. MOORE.